United States Patent [19]
Culbertson et al.

[11] Patent Number: 6,063,885
[45] Date of Patent: May 16, 2000

[54] OXAZOLINE OR OXAZINE METHACRYLATE AQUEOUS COATING COMPOSITIONS

[75] Inventors: Bill M. Culbertson, County of Franklin, Ohio; Husam A. A. Rasoul, County of Racine, Wis.

[73] Assignee: S. C. Johnson Commercial Markets, Inc., Sturtevant, Wis.

[21] Appl. No.: 09/041,059

[22] Filed: Mar. 10, 1998

[51] Int. Cl.[7] ................................................ C08F 26/06
[52] U.S. Cl. .......................... 526/260; 524/548; 524/549
[58] Field of Search ............................ 526/260; 524/548, 524/549

[56] References Cited

U.S. PATENT DOCUMENTS

| | | | |
|---|---|---|---|
| 2,114,326 | 4/1938 | Adams et al. | 260/44 |
| 2,813,862 | 11/1957 | Arens | 260/243 |
| 2,831,858 | 4/1958 | Benneville et al. | 260/244 |
| 3,037,006 | 5/1962 | Hankins et al. | 260/80.5 |
| 3,235,507 | 2/1966 | Pollack et al. | 252/301.2 |
| 3,373,194 | 3/1968 | Fuhrmann et al. | 260/559 |
| 3,438,943 | 4/1969 | Miranda et al. | 260/75 |
| 3,458,456 | 7/1969 | Levy et al. | 260/2 |
| 3,464,933 | 9/1969 | Levy et al. | 260/2 |
| 3,479,351 | 11/1969 | Metzger | 260/246 |
| 3,483,141 | 12/1969 | Litt et al. | 260/2 |
| 3,483,145 | 12/1969 | Levy et al. | 260/2 |
| 3,488,307 | 1/1970 | Walus et al. | 260/23 |
| 3,542,699 | 11/1970 | Levy et al. | 260/2 |
| 3,562,263 | 2/1971 | Litt et al. | 260/244 |
| 3,692,757 | 9/1972 | Dowbenko | 260/86.1 |
| 3,741,961 | 6/1973 | Kmiecik et al. | 260/243 R |
| 3,758,629 | 9/1973 | Thill | 260/80.8 |
| 3,846,419 | 11/1974 | Seeliger et al. | 260/244 R |
| 3,917,631 | 11/1975 | Arlt | 260/307 F |
| 3,962,235 | 6/1976 | Chamberlin | 260/244 R |
| 3,996,237 | 12/1976 | Tomalia | 260/307 F |
| 4,144,211 | 3/1979 | Chamberlin et al. | 260/29.2 R |
| 4,247,671 | 1/1981 | Reitz et al. | 526/260 |
| 4,262,112 | 4/1981 | Mark | 528/199 |
| 4,430,491 | 2/1984 | Culbertson et al. | 528/153 |
| 4,929,666 | 5/1990 | Schmidt et al. | 524/516 |
| 4,940,771 | 7/1990 | Maresca | 528/199 |
| 5,153,328 | 10/1992 | Jommi et al. | 548/239 |
| 5,227,494 | 7/1993 | Schumacher et al. | 548/237 |
| 5,300,602 | 4/1994 | Arita et al. | 526/260 |
| 5,412,151 | 5/1995 | Heidt et al. | 560/145 |
| 5,418,277 | 5/1995 | Ma et al. | 524/520 |

OTHER PUBLICATIONS

Makromol. Chem. 185 (1984), pp. 1307–1316, Novel syntheses of alternating copolymers with amide and thioether linkages by polyaddition reactions of bifunctional cyclic iminoethers with dithiols by Tadatomi Nishikubo, Takashi Iizawa, Atsushi Tokarin.

33rd International SAMPE Symposium Mar. 7–10, 1988, pp. 1531–1545, Thermosetting Matrix Compositions With Improved Toughness To Meet New FAA Aircraft Interiors Fire Worthiness Requirements by B.M. Culbertson, M.L. Deviney, O. Tiba, D.D. Carlos.

Chemical Reviews, 1971, vol. 71, No. 5, pp. 483–505, Oxazolines. Their Preparation, Reactions, and Applications by John A. Frump.

Polym. Bull (Berlin) 1984, pp. 465–70, 101:73149u Copolymerization via Zwitterion. 2. Phthalic anhydride and 2–methyl–2–oxazoline by G.S. Canessa, S.A. Pooley, M. Parza, B.L. Rivas.

Synthetic High Polymers, vol. 104, 1986, p. 5, 104; 6248z Spontaneous copolymerization of 2–methyl–2–oxazoline and N–phenylmaleimide by Cristofer I. Simionescu; Mircea Grigoras; Elena Bicu, Geta Onofrei.

Makromol. Chem., Suppl. 4, 73–84 (1981), pp. 73–84, Sequence Regulation in Spontaneous Binary and Ternary Copolymerizations Via Zwitterion Intermediates by Takeo Saegusa.

Macromolecules vol. 23, No. 4, 1990, pp. 918–925, Zwitterion Polymerization of Tetrahydro–1–[4–hydroxy–3–(2–hydroxyethoxy) phenyl] thiophenium Hydroxide Inner Sale by G. Odian, M.P. O'Callaghan, C.K. Chien, P. Gunatillake, and M. Periyasamy.

Encyclopedia of Polymer Science and Engineering vol. 4 Composites, Fabrication to Die Design (1986), pp. 525–537, Cyclic Imino Ethers, Polymerization, Edited by Herman F. Mark, Norbert M. Bikales, Charles G. Overberger, George Menges and Jacqueline I. Kroschwitz.

(List continued on next page.)

*Primary Examiner*—Bernard Lipman
*Assistant Examiner*—Caixia LuRutt
*Attorney, Agent, or Firm*—Renee J. Rymarz; Neil E. Hamilton; Warren R. Bovee

[57] ABSTRACT

A novel compound having the formula:

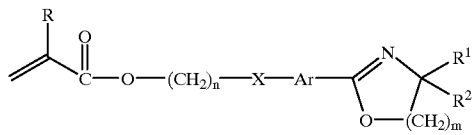

wherein R is hydrogen or an alkyl group containing 1–5 carbon atoms, $R_1$ and $R_2$ are hydrogen or a methyl group, X is nonexistent, O or —NH—, Ar is unsubstituted arylene, n is 0–10 and m is 1 or 2, wherein when X is O or —NH—, n is at least 1.

The compound of this invention is useful as a monomer which can be polymerized and/or copolymerized by both free radical and cationic polymerization.

Polymers and copolymers produced in this invention can be crosslinked and are useful in coatings, inks, overprint, varnish and surface treatment applications.

10 Claims, No Drawings

OTHER PUBLICATIONS

Macromolecules, vol. 25, No. 12, 1992, pp. 3232–3236, Novel Multifunctional Initiators for Polymerization of 2–Oxazolines by Shiro Kobayashi, Hiroshi Uyama, and Yutaka Narita.34th International SAMPE Symposium May 8–11, 1989, pp. 2483–2497, Bisoxazoline–Phenolic Resin Step–Growth Copolymerizations; New Systems For Electronic, Mold Making, And Resin Transfer Molding by B.M. Culbertson, O. Tiba, M.L. Diveney, T.A. Tufts.

Liebigs Ann. Chem. 1974, pp. 996–1009, Cyclische Imidsäureester aus Nitrilen und Aminoalkoholen by Helmut Witte, Wolfgang Seeliger.

Eur Polym.J vol. 25. No. 10, 1989, pp. 1001–1005, Copolymerization via Zwitterion of 2,4,4–Trimethyl–2–Oxazoline with N–Phenylmaleimide and p–Methoxyphenylmaleimide.Part 16.

OXAZOLINE OR OXAZINE METHACRYLATE AQUEOUS COATING COMPOSITIONS

BACKGROUND OF THE INVENTION

1. Technical Field

This invention relates to an aqueous coating composition such as coatings, inks, overprint, varnish and surface treatment applications containing an oxazoline or oxazine methacrylate polymer.

2. Background Art

An important consideration in the coating industry today is the reduction of volatile organic compounds (VOC's) in commercial paint and coatings systems. For waterborne systems this means a lower coalescent solvent level, which in turn necessitates the use of polymers with lower glass transitions (Tg's) in order for film formation to take place. Use of such polymers often results in films with inferior properties. In order to counteract this effect the Tg of the film can be raised after it has been applied. One of the most logical ways to accomplish this is by crosslinking. Traditionally, films have been cured by heating at relatively high temperatures for given periods of time. In many applications such heating is not feasible, which means polymers containing functionalities reactive enough to cure at ambient temperature must be synthesized. For waterborne polymers such functionalities must also have reasonable hydrolytic stability. Also, it is desirable if the coating materials can be polymerizable via free radical initiation. Accordingly any monomer candidate must have suitable unsaturation in addition to a curable moiety.

Monomers that meet all of these criteria are few in number, but they do exist; e.g. glycidyl (meth) acrylate, 3-isopropenyl-α,α-dimethylbenzyl isocyante, and acetoacetoxyethyl methacrylate are all currently in use in waterborne systems. There is a need for an improved monomer which will meet these criteria such as oxazoline or oxazine mechacrylate monomers which can be incorporated as polymers in an aqueous coating composition.

Oxazoline and oxazine substituted acrylic esters are described in U.S. Pat. No. 3,996,237 for use in coatings. These acrylic esters were produced by the reaction of bis-oxazoline or oxazine with an acrylic acid. In this reaction the carboxylic acid reacts with presumably one of the oxazoline rings to produce an acrylic monomer containing oxazoline moiety. However, this type of synthetic method is well known to give a mixture of di-acrylate, unreacted bis-oxazoline in addition to the desired monomer. In addition this approach is limited to the ester-amide link.

U.S. Pat. No. 4,247,671 to Reitz et al. discloses an oxazoline containing acrylic monomer specific for use in a hydrocured thermoset polymer with carboxylic cyclic anhydrieds. These oxazoline acrylic monomers contain aliphatic substitution in the 2-position of the oxazoline ring. This type of substitution, we discovered, is susceptible to hydrolysis in water and consequently can not be used in the aqueous system.

In addition, reactive polycarbonates end capped with hydroxy phenyl oxazoline are described in U.S. Pat. No. 4,940,771 and aliphatic substituted oxazolines are described in U.S. Pat. No. 3,464,933.

Other types of 2-oxazoline containing polymers are described in U.S. Pat. No. 5,300,602. These polymers are based on 2-isopropenyl-2-oxazoline which is functionally different than the monomer in our invention. In addition 2-isopropenyl-2-oxazoline has a limited use.

SUMMARY OF THE INVENTION

The novel compound of this invention has the following formula:

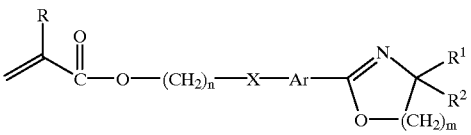

Wherein R is hydrogen or an alkyl group containing 1–5 carbon atoms, $R_1$ and $R_2$ are hydrogen or a methyl group, X is nonexistent, O or —NH—, Ar is unsubstituted arylene, n is 0–10 and m is 1 or 2, wherein when X is O or —NH— n is at least 1.

In another aspect, this invention comprises a method of preparing the oxazoline containing monomer with the formula represented above.

This compound is a monomer which can be polymerized with both ring opening and radical polymerization. Therefore this invention comprises polymers and copolymers containing the oxazoline moiety and molecular weight up to about 2,000,000. Homo-polymers and co-polymers are produced by the usual free radical techniques such as bulk, solution, emulsion, and suspension polymerization. Copolymers are obtained via addition polymerizing of a monomer mixture comprising the oxazoline containing monomers represented by the formula above and further comprises from 0 to about 90% by weight of other ethylenically unsaturated monomers. Suitable optional monomers may be used in the preparation of the co-polymers might include those identified by Rasoul et al. U.S. Pat. No. 5,391,624 in column 8 lines 30–56. Such polymers and/or copolymers with a pendant oxazoline group can further cationically polymerize to give a crosslinked polymer when utilizing an appropriate catalyst.

In another aspect, this invention comprises homo- and co-polymers produced by cationic ring opening polymerization and copolymerization. These polymer and/or copolymers with a pendant double bond can further polymerize via free radical polymerization to give crosslinked polymers. Other suitable optional monomers may be used in the preparation of such co-polymers include but not limited to other substituted oxazolines, such as 2-ethyl-2-oxazoline and other cationically polymerizable monomers.

As indicated above, the monomers of this invention can be copolymerized with a wide variety of monomers such as acrylic and vinyl monomers as well as photopolymerized with triethyleneglycol dimethacrylate.

The monomers of this invention where X is O are preferably prepared from cyanophenol which is reacted with ethylene carbonate to produce hydroxyethoxy phenyl nitrile. This nitrile is combined with ethanolamine in the presence of zinc acetate as a catalyst. Hydroxyethoxy phenyl oxazoline is produced which is reacted with methyl methacrylate to obtain ethoxyphenyl oxazolinyl methacrylate (EOPOMA).

The Examples which follow are intended as an illustration of certain preferred embodiments of the invention, and no limitation of the invention is implied.

EXAMPLE 1

4-(2-hydroxyethoxy) phenyl nitrile (HEPN)

73.0 g of 4-cyanophenol (CP, 0.613 mol), 56.0 g ethylene carbonate (EC, 0.625 mol), 1.29 g 1-methylimidazole catalyst were mixed and heated in the melt, under a stream of nitrogen. The molar ratio of reactants EC:CP was 1.02:1. The catalyst used was 1.0% by weight, relative to total CP+EC. As the reaction temperature was raised and held at 162–169° C. $CO_2$ rapidly evolved from the reaction. After 3 hours the $CO_2$ evolution stopped, indicating reaction completion. After cooling, the contents of the reactor was combined with 200 ml rapidly stirred toluene. The product was collected by suction filtration and washed on the filter with fresh toluene, removing trace catalyst and EC and/or CP. After drying under vacuum, 96.0 g of slightly yellow, crystalline 4-(2-hydroxyethoxy)phenyl nitrile (HEPN) was obtained in a 96% yield, m.p. 86–88° C.

EXAMPLE 2

2-[4-(2-Hydroxyethoxy)phenyl]-2-oxazoline (HEPO)

HEPN (95.0 g, 0.58 mol) was combined with 71.0 g of ethanolamine (EA, 1.16 mol), 3.0 g of zinc acetate, 3.2 wt %) catalyst and 150 ml of xylene, with the mixture heated under a slow nitrogen stream at reflux for 27 hr at 130–137° C. After cooling, the reaction mixture was combined with 200 ml toluene, while stirring. After standing at ambient conditions for several hours, the mixture separated into two phases, with the upper phase a clear solution. The clear solution was decanted, leaving a thick slurry of crystalline product. The product was collected by suction filtration and was exhaustively washed with water to remove water soluble impurities, such as EA. After drying under vacuum, the crude product, 2-[4-(2-hydroxyethoxy)phenyl]-2-oxazoline (HEPO) was obtained in a 82% yield, m.p. 149–150° C. The structure for HEPO was confirmed by FT-IR and IH-NMR.

EXAMPLE 3

2-(4Ethoxyphenyl)-2-oxazolinyl methacrylate (EOPOMA)

HEPO (86.0 g, 0.42 mol) was dissolved in 1500 ml of dry tretrahydrofuran. Methyl methacrylate (166 g, 1.7 mol) was combined with the HEPO mixture, along with 7 ml of a 25 wt % sodium methoxide/methanol solution. Additional inhibitor, phenothiazine (0.35 g) was added and the solution stirred under a nitrogen stream. The solution was heated under reflux for 8 hr, with the methanol/tetrahydrofuran collected in a Dean-Stark trap. The cooled solution was filtered to remove any precipitate. After removal of the tetrahydrofuran and other volatiles under vacuum, the crude product was dissolved in acetone. Filtration of the acetone solution removed a small amount of unreacted HEPO. The acetone solution of the crude product was combined with 600 ml of distilled water with vigorous stirring, giving a slightly yellow colored precipitate. After collection and drying under vacuum, the EOPOMA monomer was collected in a 60% yield, m.p. 54–57° C.

EXAMPLE 4

Polymerization of 2-(4-Ethoxyphenyl)-2-oxazolinyl methacrylate

EOPOMA (10 g) was combined with 0.1 g of 2-2'-azobisisobutyronitrile (AIBN) initiator and 10 g of toluene solvent in a glass vial. The mixture was purged with a slow nitrogen stream for several minutes and sealed in the glass vial. The sealed vial was placed in a thermostated bath at 70° C. for 24 hr. The clear very viscous product was diluted with more toluene and precipitated with methanol. After washing with methanol and drying, the structure of the copolymer was examined by FT-IR and $^1$H-NMR. The copolymer was shown to have the expected oxazoline C=N IR band and the NMR spectrum showed the expected oxazoline $CH_2CH_2$ protons.

EXAMPLE 5

CoPolymerization of 2-(4-Ethoxyphenyl)-2-oxazolinyl methacrylate with styrene

Styrene (3.7 g) was combined with 0.66 g of EOPOMA and 0.088 g of AIBN in a glass vial. The monomers weight ratio was 85/15 (styrene/EOPOMA). The mixture was purged with a slow nitrogen stream for several minutes and sealed in the glass vial. The sealed vial was placed in a thermostated bath at 70° C. for 24 hr. The clear solid plug was dissolved in $CHCl_3$ and precipitated with methanol. After washing with methanol and drying, the structure of the copolymer was examined by FT-IR and $^1$H-NMR. The copolymer was shown to have the expected oxazoline C=N IR band and the NMR spectrum showed the expected oxazoline $CH_2CH_2$ protons.

In the manner set forth in Example 5, EOPOMA can be combined with other ethylenically unsaturated monomers such as tertiarybutyl styrene.

EXAMPLE 6

CoPolymeriztion of 2-(4-Ethoxyphenyl)-2-oxazolinyl methacrylate with methyl methacrylate Using a similar technique described in Example 5, EOPOMA was copolymerized with methyl methacrylate. In this case, 1.0 g of EOPOMA was combined with 4.1 g of methyl methacrylate (20:80 wt % mixture) and 0.039 g AIBN and the clear mixture sealed in a glass vial. Prior to sealing the vial, the solution and the vial were purged with nitrogen for several minutes. The vial and its contents were heated at 60° C. for 20 hr, followed by heating for 3 hr at 110° C. The clear solid plug was broken up and dissolved in chloroform. The chloroform solution was added slowly to stirred hexane to recover the solid polymer. The copolymer was collected by filtration, dried under vacuum, and examined by FT-IR and $^1$H-NMR. The structure was confirmed, showing both monomer residues.

EXAMPLES 7–9

Crosslinking of Polymers

These Examples illustrate the crosslinking of the polymers prepared in Examples 4–6 by cationic polymerization of the pendant oxazoline ring.

To a solution of 10 g of oxazoline containing polymer prepared in Examples 4–6 in a suitable solvent such as $CHCl_3$ was added catalytic amount of p-toluenesulphonic acid. The mixture was applied on aluminum plate and allowed to dry. The coating was then he ated to 170 C for one hour. This produced crosslinked coatings insoluble in organic solvents.

EXAMPLE 10

Photopolymerization with the triethylene glycol dimethacrylate

Monomer EOPOMA blended with triethyleneglycol dimethacrylate (TEGDMA) in 50:50 weight ratio was found to be photocurable by intense visible light, using a very small amount of camphorquinone (CQ) photoinitiator and 2-(dimethylamino)ethyl methacrylate accelerator. Photopolymerization examinations were performed on formulated samples by using both DPC and a hand-control visible light generator to confirm polymerization.

EXAMPLE 11

Cationic polymerization homopolymer

The homopolymerization of EOPOMA was also performed, overnight, in a small sealed glass vial over a termperature range of 160–167° C. using methyl tosylate as initiator. A clear, yellow glassy solid polymer was obtained which showed an essentially identical glass transition temperature at 165.5° C. The glassy polymer did not dissolve in water, $CHCl_3$, THF etc. solvents. However, it was soluble in strong polar solvents such as DMSO and DMF. FT-IR and $^1$H-NMR examinations were also done on this homopolymer to confirm polymerization.

EXAMPLE 12

Cationic copolymerization with 2-ethyl-2-oxazoline

The cationic copolymerization of EOPOMA with 2-ethyl-2-oxazoline was also conducted. 2-ethyl-2-oxazoline (2.01 g) was combined with 0.50 g of EOPOMA (80:20 wt % mixture) in a small glass vial. Methyl tosylate (2 drops) was added, the vial was purged with nitrogen and sealed. The mixture in the glass vial was heated at 120–° C. for 20 hr. The slightly yellow solid product was soluble in water and other polar solvents.

EXAMPLES 13–15

Coating Compositions

These Examples illustrate the preparation of crosslinkable clear coating compositions.

Polymers or mixtures thereof prepared in Examples 4–6 can be dispersed in an aqueous medium using appropriate nonionic or anionic surfactants. These dispersions can then be blended with an alkaline solution or a dispersion of polymer containing two or more carboxylic acid moieties per polymer chain. The produced composition can be applied on substrates such as aluminum wood or other surfaces. After drying the coating will be crosslinked at room temperature or at elevated temperature to give crossliked coating film insoluble in organic solvents.

In addition to the polymerization of EOPMA as set forth in Examples 5,6 and 10, it should be understood that the monomers of the invention can be polymerized with other acrylic monomers such as ethyl acrylate, ethyl methacrylate, propyl acrylate, propyl methacrylate, butyl acrylate, butyl methacrylate, 2-ethylhexyl acrylate, 2-ethylhexyl methacrylate, decyl acrylate, decyl methacrylate, hydroxyethyl acrylate, hydroxyethyl methacrylate, hydroxypropyl acrylate, hydroxpropyl methacrylate, and combinations thereof.

Suitable vinyl monomers include but are not limited to 1,2-butadiene; 1,3-butadiene; chloroprene; 1,3,5-hexatriene; alpha-methyl styrene; vinyl acetate; vinyl chloride; vinyl toluene; vinylidene chloride; and various combinations thereof. Further, additional crosslinking is also included such as between the reactive groups of the copolymers including ring opening of the oxazoline or oxazine moiety.

In the previous Examples 1–3, the synthesis of the monomer of this invention is set forth where n is 2. To prepare a monomer where n is 3 or higher a chloroalkanol with the desired carbon chain length would be employed and reacted with 4-cyanophenol. For example, where n is 3,3-chloropropanol would be reacted with the 4-cyanophenol which would subsequently be combined with ethanolamine and further reaction with methyl methacrylate as set forth in Examples 2 and 3. In place of methyl methacrylate, the corresponding alkyl substituted acrylates would be used to obtain monomers where R is 2–5.

To prepare the monomer where m is 2,3-amino-1-propanol would be substituted for ethanolomine as set forth in Example 2 followed by the procedure of Example 3 and the teachings described herein for synthesizing the various substituents.

Also in the previous Examples 1–3, a synthesis is set forth for preparing the monomer of this invention where X=O. In the instance where X is NH, a similar sequence of steps with described substituents would be employed, however, the starting material would be 4-aminophenyl nitrile rather than 4-cyanophenol.

Further, an alternative procedure can be employed for preparing the monomer when X=O. This would involve reacting methyl 4-hydroxy benzoate with ethanolamine to obtain N-(2-hydroxyethyl)-4-hydroxy benzamide. The resulting benzamide is treated with $SOCl_2$ to give 4-hydroxy phenyl-2-oxazoline. Reaction of the latter with ethylene carbonate results in HEPO. Subsequent reaction with methyl methacrylate (Example 3) results in the desired monomer.

To prepare the monomer of this invention where X is nonexistant, 4-(2-hydroxyethyl) phenyl nitrile is reacted with ethanolamine in the presence of zinc acetate catalyst to obtain 2-[4-(2-hydroxyethyl) phenyl]-2-oxazoline, as described in Example 2, which subsequently reacted with methyl methacrylate as described in Example 3 to obtain the desired monomer.

The monomers of this invention where $R_1$ or $R_2$ is methyl can be prepared by substituting 2-amino-2-methyl-1-propanol for ethanolamine and following the procedure set forth in Example 2 and the teachings herein to prepare the various substituents.

The preferred unsubstituted Ar is linked through the para position. It will be obvious to those skilled in the art that ortho and meta linking positions are easily substituted.

Industrial Applicability

The monomers of this invention when polmerized and further crosslinked result in crosslinked polymers useful in coatings, inks, overpaint varnishes, and surface treatment applications. They can be easily incorporated and cured in an evaporable aqueous carrier using standard di or polycarboxylic acids. In the instance of copolymerization with 2-ethyl-2-oxazoline UV and intense visible light curing can be effected.

That which is claimed is:

1. An aqueous formulation comprising (a) a polymeric ingredient having an oxazoline or oxazine ring moiety derived from a compound having the formula:

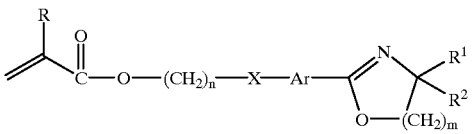

wherein R is hydrogen or an alkyl group containing 1–5 carbon atoms, $R_1$ and $R_2$ are hydrogen, or a methyl group, —X— is a bond, —O— or —NH—, Ar is unsubstituted arylene, n is 0–10 and m is 1 or 2; wherein when —X— is —O— or —NH—, n is at least 1 and (b) an evaporable aqueous carrier.

2. An aqueous formulation according to claim 1 wherein R is methyl, $R_1$ and $R_2$ are hydrogen, X is O, n is 2 and m is 1.

3. An aqueous formulation according to claim 1 wherein R is methyl, $R_1$ and $R_2$ are hydrogen, X is NH, n is 2 and m is 1.

4. An aqueous formulation according to claim 1 wherein R is methyl, $R_1$ and $R_2$ are methyl, X is nonexistent, n is I and m is 1.

5. An aqueous formulation according to claim 1 wherein R is methyl, $R_1$ and $R_2$ are hydrogen, X is O, n is 2 and m is 2.

6. An aqueous formulation according to claim 1 wherein R is methyl, $R_1$ and $R_2$ are hydrogen, X is O, n is 3 and m is 2.

7. An aqueous formulation according to claim 1 wherein said compound is homopolymerized.

8. An aqueous formulation according to claim 1 wherein said compound is copolymerized with styrene.

9. An aqueous formulation according to claim 1 wherein said compound is copolymerized with tertiarybutyl styrene.

10. An aqueous formation according to claim 1 wherein said compound is copolymerized with methyl methacrylate.

* * * * *

UNITED STATES PATENT AND TRADEMARK OFFICE
CERTIFICATE OF CORRECTION

PATENT NO : 6,063,885
DATED : May 16, 2000
INVENTOR(S) : Bill M. Culbertson, et al.

It is certified that error appears in the above-identified patent and that said Letters Patent is hereby corrected as shown below:

On title page, item 56 Other Publications (Page 2)
 Insert a new paragraph before "34th International SAMPE Symposium...", indicating a new reference
Col. 5, line 30
 replace "120- °C"
 with --120 - 130 °C--.
Col. 5, line 45
 insert a "," before the word "wood".

Signed and Sealed this

Tenth Day of April, 2001

Attest:

NICHOLAS P. GODICI

Attesting Officer    Acting Director of the United States Patent and Trademark Office